US007706253B1

(12) United States Patent
Pampati et al.

(10) Patent No.: US 7,706,253 B1
(45) Date of Patent: Apr. 27, 2010

(54) GATEWAY TO ROUTE COMMUNICATIONS DURING A FAULT

(75) Inventors: Sreedhar Pampati, Fremont, CA (US); Terry Hardie, Union City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 963 days.

(21) Appl. No.: 11/292,762

(22) Filed: Dec. 2, 2005

(51) Int. Cl.
*G01R 31/08* (2006.01)
*H04L 12/16* (2006.01)
*H04L 12/66* (2006.01)

(52) U.S. Cl. ........................ 370/216; 370/242; 370/252; 370/261; 370/352

(58) Field of Classification Search ................ 370/216, 370/217–218, 242, 221, 261, 352, 252
See application file for complete search history.

(56) References Cited

U.S. PATENT DOCUMENTS

| | | | | |
|---|---|---|---|---|
| 5,253,288 A * | 10/1993 | Frey et al. | ............... | 379/221.03 |
| 6,792,266 B1 * | 9/2004 | Masuda et al. | .............. | 455/417 |
| 6,992,974 B1 * | 1/2006 | Tripathi | ...................... | 370/216 |
| 7,146,153 B2 * | 12/2006 | Russell | .................... | 455/404.2 |
| 7,395,336 B1 * | 7/2008 | Santharam et al. | .......... | 709/227 |
| 7,406,306 B2 * | 7/2008 | Gallant et al. | ............... | 455/406 |
| 7,411,917 B1 * | 8/2008 | Hardie et al. | ............... | 370/252 |
| 7,412,598 B1 * | 8/2008 | Gleichauf | ................... | 713/155 |
| 7,508,754 B1 * | 3/2009 | Sankaranaraynan et al. | . | 370/225 |
| 7,613,170 B1 * | 11/2009 | Grabelsky et al. | ........... | 370/352 |
| 2002/0145997 A1 * | 10/2002 | Bushnell et al. | ............. | 370/352 |
| 2003/0123436 A1 * | 7/2003 | Joseph et al. | ............... | 370/352 |
| 2005/0180317 A1 * | 8/2005 | Shimada | ..................... | 370/217 |
| 2005/0180396 A1 * | 8/2005 | Lim | ............................ | 370/352 |
| 2005/0220039 A1 * | 10/2005 | Hoshino et al. | ............. | 370/261 |
| 2005/0237925 A1 * | 10/2005 | Taylor et al. | ................ | 370/216 |
| 2007/0047571 A1 * | 3/2007 | Kandikonda et al. | ........ | 370/449 |

* cited by examiner

*Primary Examiner*—Kwang B Yao
*Assistant Examiner*—Candal Elpenord
(74) *Attorney, Agent, or Firm*—Townsend and Townsend and Crew

(57) ABSTRACT

Telephones connected to a gateway can still make calls when connectivity to a central processing device is lost. The gateway determines when connectivity with the central processing device is lost. When a communication is received from a first telephone for second telephone, the communication is routed to the second entity by bypassing the central processing device. This is possible using identification information that is stored for the second entity when the second entity registered with the central processing device.

19 Claims, 6 Drawing Sheets

GATEWAY TO ROUTE COMMUNICATIONS DURING A FAULT

BACKGROUND OF THE INVENTION

Embodiments of the present invention generally relate to telecommunications and more specifically to techniques for rerouting of communications when connectivity to a central communication processor is lost.

A central office exchange service (Centrex) is a service offered by local telephone companies in which phone facilities at the phone companies' central (local) office are offered to users. For example, the Centrex service allows centralized services to be provided for business companies. The Centrex services may be similar to those provided by a private branch exchange (PBX) service, which is owned by a business entity, and provides services to users in the business entity. The Centrex, which may be referred to by different names in different locations, provides users in a business entity with as much if not more control over the services that are offered by a PBX system.

Calls from a user of the business entity are typically routed through the Centrex. In a Voice over IP network using SIP, these calls typically are routed through a wide area network (WAN) that is external to the business entity. For example, the wide area network may include a network from a business office to another location, such as a central office or another office. The wide area network may be unreliable and connectivity may be lost with the Centrex. Further, the Centrex may not be functioning or may crash. If connectivity to the Centrex is lost, then the users of the business entity may not be able to communicate with other users. For example, a user may not be able to make a telephone call to any other users because the telephone call needs to be routed to the Centrex in order to be routed to its destination. Thus, even calls to users in the same office building cannot be made. Accordingly, the business entity will experience downtime for the telephone system if connectivity to the Centrex is lost.

BRIEF SUMMARY OF THE INVENTION

Embodiments of the present invention generally relate to techniques for rerouting communications when connectivity to a central communication processor is lost.

In one embodiment, telephones connected to a gateway can still make calls when connectivity to a central processing device is lost. The gateway determines when connectivity with the central processing device is lost. When a communication is received from a first telephone for second telephone, the communication is routed to the second entity by bypassing the central processing device. This is possible using identification information that is stored for the second entity when the second entity registered with the central processing device.

In one embodiment, a method for providing routing of calls when connectivity with a central processing device is lost is provided. The method includes: receiving one or more registration requests from one or more entities; sending the one or more registration requests to the central processing device; receiving confirmation that the one or more registration requests have registered the one or more entities with the central processing device; storing information for the one or more entities at the gateway in response to the one or more registration requests, the information including identification information for the one or more entities; determining that the connectivity with the central processing device is lost; receiving a communication from a first entity in the one or more entities for second entity in the one or more entities; and routing the communication to the second entity using the identification information stored for the second entity wherein the communication bypasses the central processing device.

In another embodiment, a gateway configured to provide routing of calls when connectivity with a central processing device is lost is provided. The gateway comprises: logic configured to receive one or more registration requests from one or more entities; logic configured to send the one or more registration requests to the central processing device; logic configured to receive confirmation that the one or more registration requests have registered the one or more entities with the central processing device; logic configured to store information for the one or more entities at the gateway in response to the one or more registration requests, the information including identification information for the one or more entities; logic configured to determine that the connectivity with the central processing device is lost; logic configured to receive a communication from a first entity in the one or more entities for second entity in the one or more entities; and logic configured to route the communication to the second entity using the identification information stored for the second entity wherein the communication bypasses the central processing device.

In another embodiment, a system configured to provide routing of calls when connectivity with a central processing device is lost is provided. The system comprises: a plurality of communication devices; a central processing device configured to process a communication from a first communication device to a second communication device in the plurality of communication devices; and a gateway comprising: logic configured to receive registration requests from first and second communication devices; logic configured to send the registration requests to the central processing device; logic configured to receive confirmation that the registration requests have registered the first and second communication devices with the central processing device; logic configured to store information for the first and second communication devices at the gateway in response to the one or more registration requests, the information including identification information for the first and second communication devices; logic configured to determine that the connectivity with the central processing device is lost; logic configured to receive a communication from the first communication device for the second communication device; and logic configured to route the communication to the second entity using the identification information stored for the second entity wherein the communication bypasses the central processing device.

A further understanding of the nature and the advantages of the inventions disclosed herein may be realized by reference of the remaining portions of the specification and the attached drawings.

DETAILED DESCRIPTION OF THE INVENTION

Figure 1:
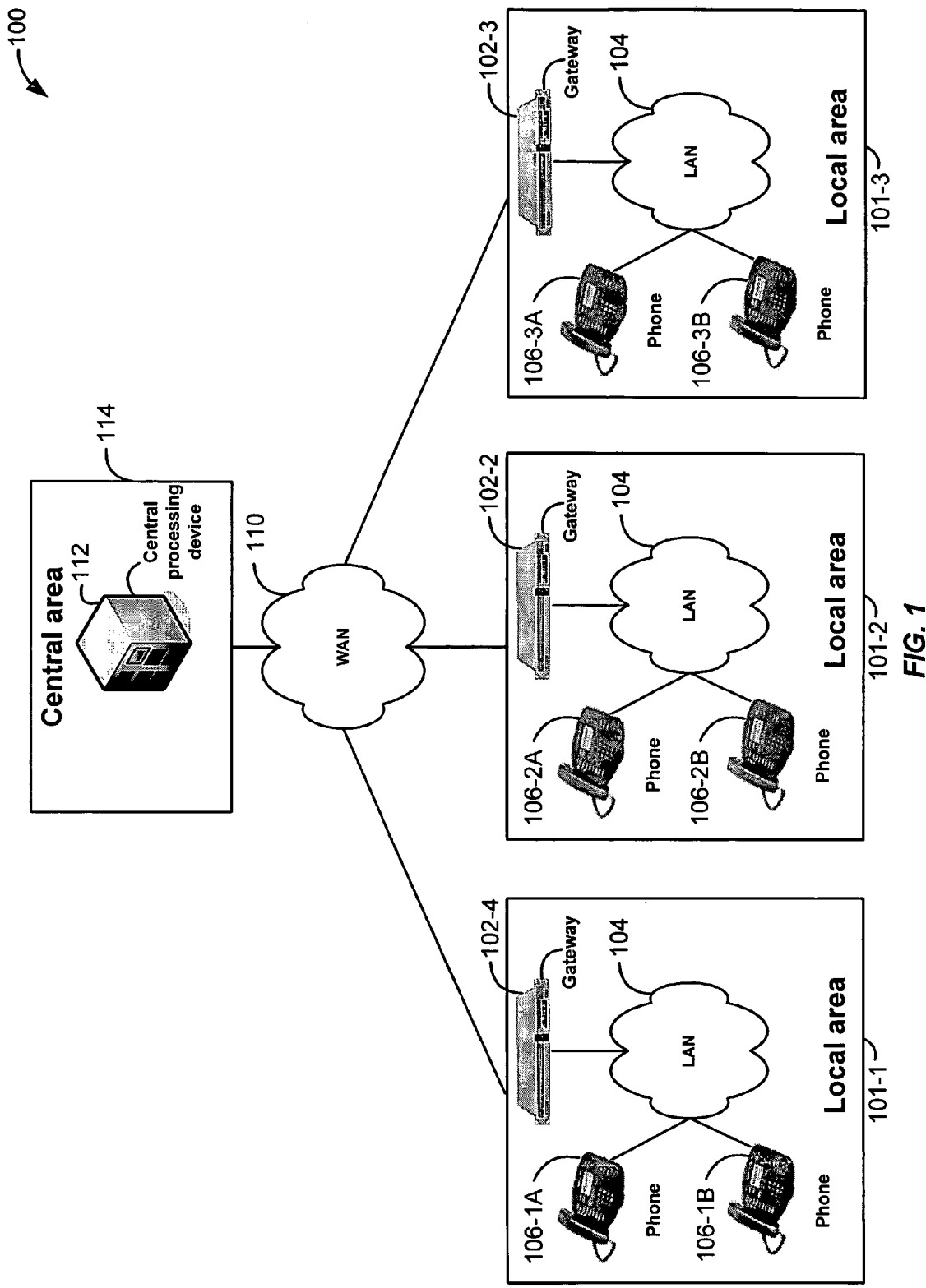
FIG. 1 depicts a system according to one embodiment of the present invention.

FIG. 1 depicts a system 100 according to one embodiment of the present invention.

As shown, system 100 includes one or more local areas 101, a wide area network (WAN) 110, and a central area 114. Local areas 101 may include a gateway 102, a local area network (LAN) 104, and one or more telephones 106. Central area 114 may include a central processing device 112.

Local area 101 may include any number of telephones 106. In one embodiment, local area 101 may be a branch office for a business. For example, a business may have multiple branch offices 101-1, 101-2, and 101-3. In one example, a business may have offices in San Francisco, Los Angeles, and New York. Also, local areas 101 may be divided in any other ways, such as by floors, sections of floors, etc.

A local area 101 includes a gateway 102. Gateway 102 is configured to transfer communications from telephones 106 to central processing device 112. In one embodiment, when a connection request is received from a telephone 106 for another telephone 106, the request goes through gateway 102, which transfers the request to central processing device 112. Gateway 102 may be at the border of local area 101. In one embodiment, communications from telephones 106 found in local area 101 go through gateway 102 for routing.

Local area network 104 may be any network found in area 101. In one embodiment, a local area network is a group of computers and associated devices that share a common communications line or a wireless link within a small geographic area. The LAN may serve as few as two or three users (such as in a home network) or as many as thousands of users (for example, as in a fiber distributed data interface (FDDI)).

Telephones 106 may include any devices configured to send communications to gateway 102. For example, telephones 106 include cellular phones, telephones, personal computers, personal digital assistants (PDAs), personal PCs, blackberry devices, GoodLink devices, softphones, VoIP telephones, instant message clients, etc. In one embodiment, telephones 106 are configured to communicate using a SIP protocol. In other embodiments, telephones 106 may communicate using a non-SIP protocol.

Wide area network (WAN) 110 includes any network that can route communications from gateway 102 to central processing device 112. In one embodiment, a wide area network is a geographically disbursed telecommunications network. Wide area network 110 may be defined as a network that is outside of local areas 101 and may be shared by multiple local areas 101 or local area networks (customer networks). For example, WAN 110 may include privately owned or rented networks and/or public (shared user) networks. One example of a WAN is a metropolitan area network (MAN).

Central area 114 includes any area from which a central point in communications is provided. For example, local area 101-1, local area 101-2, and local area 101-3 send communications through central area 114 to other destinations. In one embodiment, central area 114 includes a central office that is operated by a local telephone company.

In one embodiment, central processing device 112 may be a Centrex. The Centrex may be any central processing device configured to process communications from local areas 101. The Centrex provides a service that allows centralized services to be provided for business companies. The Centrex services may be similar to those provided by a private branch exchange (PBX) service, which is owned by a business entity. The Centrex, which may be referred to by different names and different locations, provides users in a business entity with as much, if not more, control as the services offered by a PBX system. Although a Centrex is described, it will be understood that any centralized device that provides routing of communications may be used.

In one embodiment, central communications device 112 is configured to route calls using the SIP protocol. However, it will be understood that central processing device 112 may use other protocols to route communications. Central processing device 112 can also authenticate the users of the registrations and also callers to ensure that the calls are coming from authorized users. It can use information such as usernames and passwords to perform the authentication.

Figure 2:
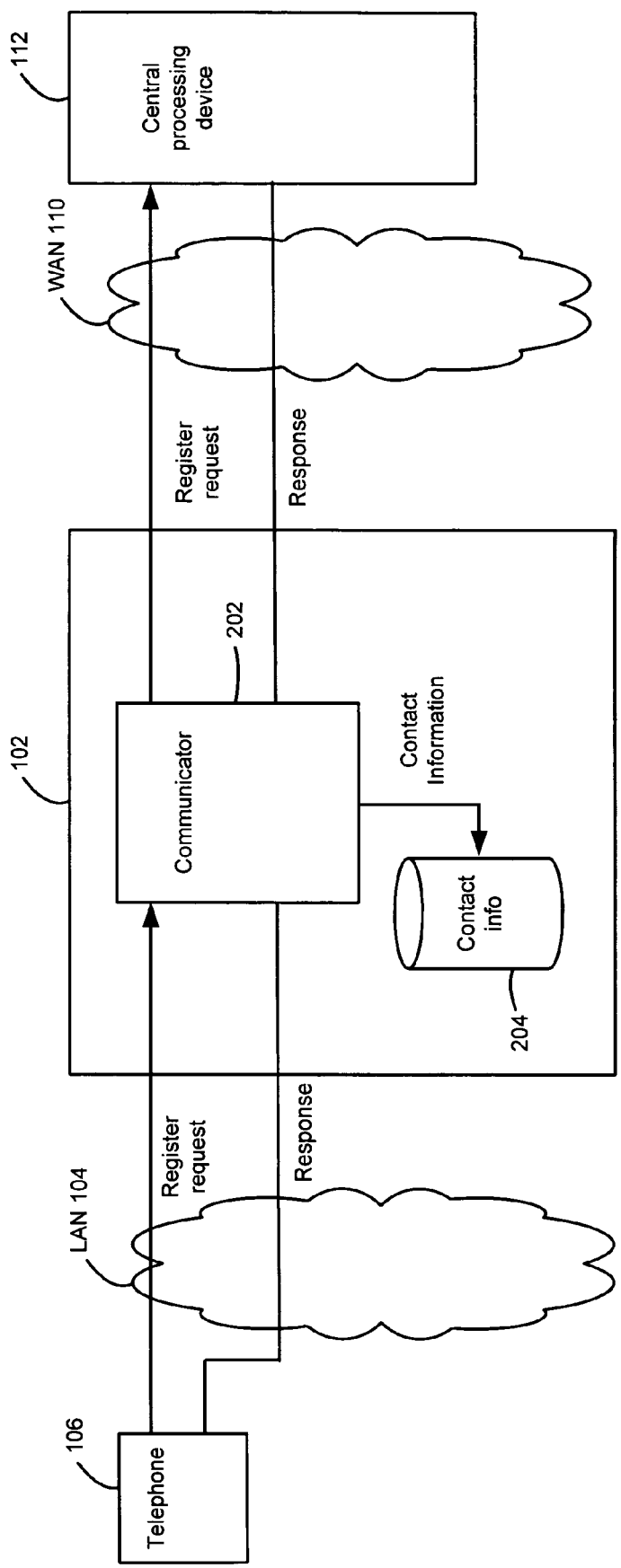
FIG. 2 depicts a gateway according to embodiments of the present invention.

FIG. 2 depicts a more detailed embodiment of gateway 102 according to embodiments of the present invention. As shown, gateway 102 includes a communicator 202 and storage device 204.

Telephone 106 sends a register request. The register request is any request that registers telephone 106 with central processing device 112. For example, the register request may provide information for telephone 106, such as contact information, or indicate that telephone 106 is active and can receive communications. When telephones 106 are booted up or turned on, they may all register with central processing device 112.

Communicator 202 is configured to receive the register request and forward it to central processing device 112. In one embodiment, telephones 106 in a local area 101 have private identifiers, such as private Internet protocol (IP) addresses. Communicator 202 is configured to translate the private identifiers into public identifiers, such as public IP addresses.

The private identifier may be an identifier used in a local area 101. The public identifier may be an identifier used externally. An example of a private identifier may be a local extension, such as 4512 and an example of a public identifier may be a phone number such as 555-4512. Communicator 202 is configured to translate the private identifier to a public identifier (e.g., public address, extensions with prefixes, etc.).

Central processing device 112 processes the request. For example, central processing device 112 may determine if the request is valid and either accept or reject the request in a response.

Communicator 202 is configured to receive a response for a register request from central processing device 112. The response is sent over WAN 110. The response may include contact information, which may include a username, public identifier, how long the registration is valid, etc. The username and public identifier may be for the telephone 106-1 that sent the registration request.

The register request identifies telephone 106 to central processing device 112. The contact information for telephone 106 is then stored in storage device 204. Contact information is typically stored for the duration requested in the REGISTER request but gateway 102 may choose to store the contact information for longer periods to handle lost connections to central processing device 112. Thus, the contact information may then be used by gateway 102 to contact a telephone 106 when connectivity to central processing device 112 is lost.

Communicator 202 then sends the response to telephone 106. As will be described below, telephone 106 can then connect with destination telephones 106 after registering.

Figure 3:
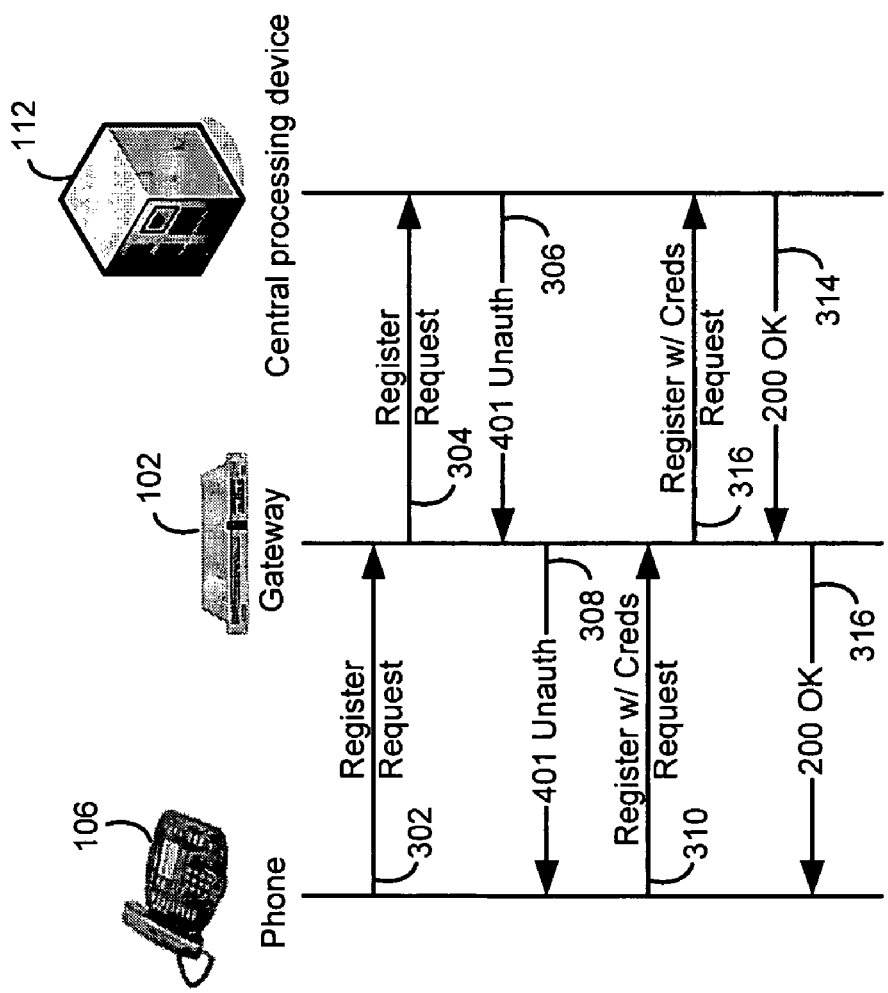
FIG. 3 depicts a message below for registering with a central processing device using a telephone according to one embodiment of the present invention.

FIG. 3 depicts a message below for registering with central processing device 112 using a telephone 106 according to one embodiment of the present invention. At 302, telephone 106 sends a register request. The register request is received at gateway 102. Gateway 102 may then send the register request to central processing device 112 at 304.

In one embodiment, at 306, central processing device 112 may send an unauthorized message, such as a 401 Unauth message. This message may indicate that the register request was an unauthorized register request. For example, central processing device 112 may require the register request to be sent using credential information. This model eliminates the need for an intermediate device, such as gateway 102, to have the credential information. The authentication information such as the username and password is provisioned only on the telephone 106 and central processing device 112. Credential information may be any information that is used to authenticate telephone 106, such as a username, password, etc. If the register request does not include this information and thus sends the unauthorized registration request message to telephone 106 at 308.

Telephone 106 receives the message and sends a registration request with credentials at 310. Gateway 102 forwards the registration request with credentials to central processing device 112.

Central processing device 112 receives the registration request with credentials and if the credentials are valid, may approve the registration request. Central processing device 112 then stores the contact information. If the registration is approved, at 314, a confirmation message, such as a 200 OK message, may be sent. Gateway 102 receives the message and forwards it to telephone 106 at 316. The contact information sent with the register request from telephone 106 is stored at gateway 102. If the authorized message is received at gateway 102, then the contact information is stored at gateway 102. Because the authorized message is received from central processing device 112, gateway 102 can assume that the telephone 106 is authorized.

Figure 4:
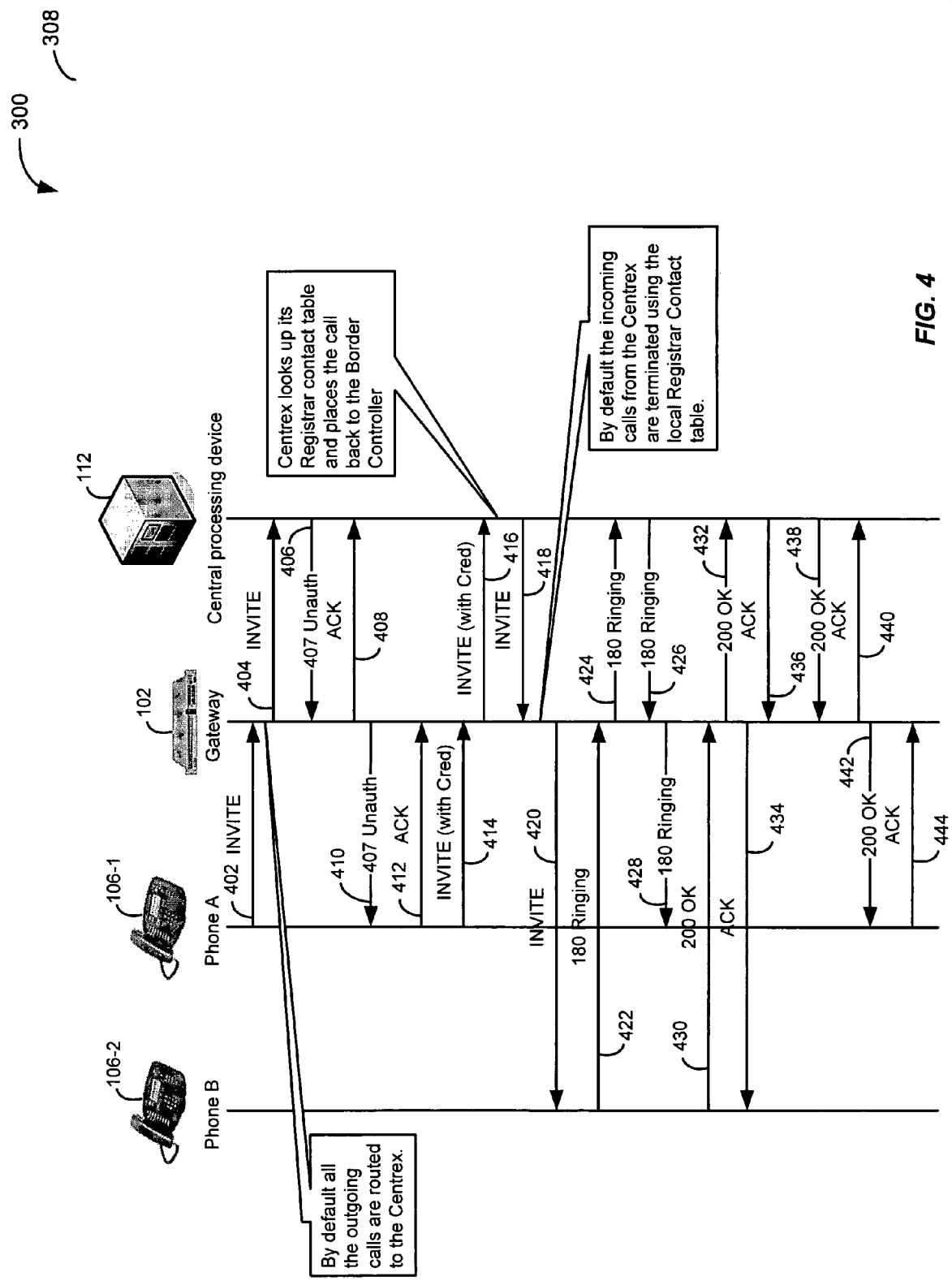
FIG. 4 shows the message flow for routing communications between a first telephone and a second telephone according to one embodiment of the present invention.

FIG. 4 shows the message flow for routing communications between a telephone 106-1 and a telephone 106-2 according to one embodiment of the present invention. As shown, an INVITE message is sent from telephone 106-1. The INVITE message is for a destination, such as telephone 106-2. Gateway 102 receives the INVITE message and forwards it to central processing device 112 at 404.

Central processing device 112 may send an unauthorized registration request message such as a 407 Unauth message, at 406. Gateway 102 receives the unauthorized registration request message and sends an acknowledgement message, such as an ACK message, at 408. Gateway 102 forwards the unauthorized registration request message to telephone 106 at 410.

Telephone 106-1 sends an acknowledgement message (ACK) to gateway 102 at 412. Because gateway 102 has already acknowledged receiving the unauthorized registration request message at 408, gateway 102 may suppress the acknowledgement message received at 412.

At 414, telephone 106-1 sends an INVITE message with credentials. Gateway 102 receives the INVITE message and forwards the INVITE message with credentials to central processing device 112 at 416. When central processing device 112 receives the INVITE message with credentials at 416, central processing device 112 may look up information for telephone 106-2 in its registrar contact table. Central processing device 112 then places the call to an appropriate gateway 102 that handles telephone communications for telephone 106-2.

Assuming the credentials and the INVITE request are valid, central processing device 112 sends an INVITE message to telephone 106-2 at 418. When the INVITE message is received at 418, gateway 102 may translate an external identity to a local identity in order to route the call to telephone 106-2. The information may be translated using the contact information stored in storage device 204. Gateway 102 receives the INVITE message for telephone 106-2 and forwards it to telephone 106-2 at 420.

Telephone 106-2 sends a message indicating it is ringing at 422. This message may be a 180 Ringing message. Gateway 102 receives the Ringing message and forwards it to central processing device 112 at 424. Central processing device 112 then forwards a 180 Ringing message to telephone 106-1 at 426, which is received at gateway 102. The Ring message is then forwarded to telephone 106 at 428.

When telephone 106-2 is picked up, such as when the user answers the phone or voicemail picks up the message, a confirmation message, such as a 200 OK message, is sent from telephone 106-2 to central processing device 112 at 430. Gateway 102 receives the confirmation message, and may translate the message from its local identifier to a public identifier. The message is then sent to central processing device 112 at 432. Gateway 102 also sends an acknowledgement message to telephone 106-2 at 434. Central processing device 112 also sends an acknowledgement message at 436 to gateway 102. Because gateway 102 has already sent an acknowledgement message at 434, the message that is received at 436 may be suppressed.

Central processing device 112 then sends a confirmation message, such as a 200 OK message to telephone 106. This message is intercepted at gateway 102. Gateway 102 forwards an acknowledgement message back to central processing device 112. Gateway 102 then forwards the confirmation message at 442 to telephone 106-1. Telephone 106-1 may send an acknowledgement message at 444 to gateway 102. Gateway 102 may suppress this message.

After the above messaging scheme, telephone 106-1 may be connected to telephone 106-2. A communication session, such as a phone conversation, may then be performed between telephone 106-1 and telephone 106-2.

Figure 5:
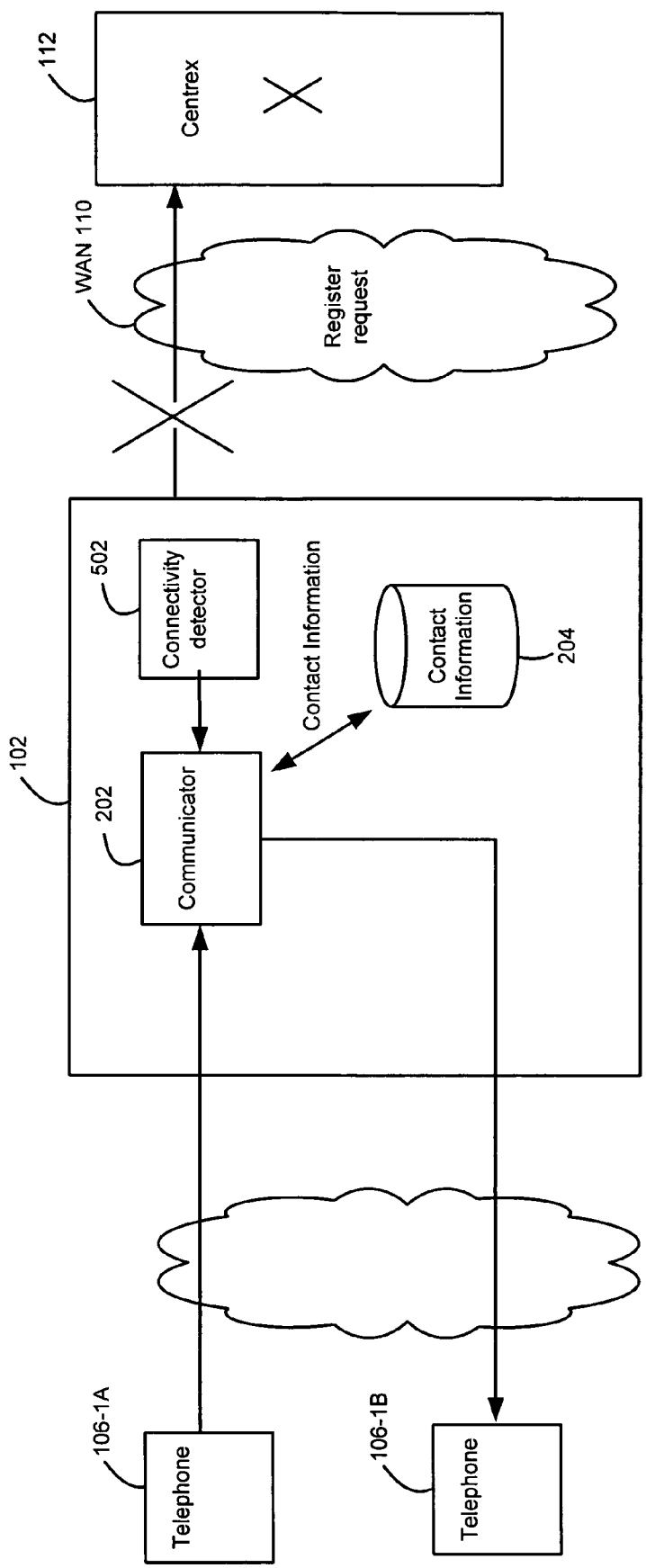
FIG. 5 depicts a more detailed block diagram of the gateway for handling communications when connectivity with the central processing device is lost according to one embodiment of the present invention.

The above scheme of connecting a communication between telephone 106-1 and telephone 106-2 may not be allowed if connectivity is lost between gateway 102 and central processing device 112. FIG. 5 depicts a more detailed block diagram of gateway 102 for handling communications when connectivity with central processing device 112 is lost according to one embodiment of the present invention.

As shown, a connectivity detector 502 is configured to detect when connectivity to central processing device 112 is lost. For example, connectivity with central processing device 112 may be lost if a connection through WAN 110 is lost, such as when a network connection is down. Also, connectivity may be lost if central processing device 112 is not functioning correctly. For example, central processing device 112 may fail, be rebooted, etc.

Connectivity detector 502 is configured to use any techniques to determine if connectivity is lost. For example, connectivity detector 502 may ping central processing device 112 at certain intervals. The ping may involve sending messages that require responses from central processing device 112. If a response is not received from central processing device 112, connectivity detector 502 may determine that connectivity has been lost. In one embodiment, connectivity detector 502 may use ICMP pings or SIP options requests to keep track of the connectivity status.

If, at any point, connectivity detector 502 determines that connectivity is lost at central processing device 112 (denoted by the "X" in FIG. 5), connectivity detector 502 notifies communicator 202 that connectivity has been lost. Communicator 202 is then configured to reroute calls when connectivity is lost such that they may not be routed to central processing device 112.

In one embodiment, communicator 202 is able to route calls between telephones 106 that are found in local area 101. For example, when telephone 106-1A sends an INVITE request for telephone 106-1B, communicator 202 may use the contact information received from central processing device 112 during the registration to route the call between telephone 106-1A and telephone 106-1B. Because the contact information is stored after an authorization message is received from central processing device 112, communicator 202 can assume that if contact information is found in storage device 202 for both telephones 106-1A and 106-1B, then communicator 202 is authorized to route the communication between telephone 106-1A and telephone 106-1B.

Checking if a telephone is authorized to initiate a communication is advantageous because network security is still enforced. Central processing device 112 normally routes communications and can authorize telephones 106. However, without communicating with central processing device 112, gateway 102 may not know if a telephone is authorized. Thus, the storing authorization information from the registration process, gateway 102 may authenticate a telephone 106 that has registered.

As shown, then communicator 202 receives a request for connecting a communication from telephone 106-1A for telephone 106-1B. The request is not routed to central processing device 112. Rather, communicator 202 looks up the contact information for telephone 106-1B in storage device 204. If the contact information found in storage device 102, it may indicate that the registration for telephone 106-1B is valid. For example, the contact information may have been authorized by central processing device 112.

If the contact information is found, the communication is routed to telephone 106-1B using the contact information. The above process described in FIG. 4 may be then performed with communicator 202 playing the role of gateway 102 and central processing device 112 together. For example, this process will be described in more details in FIG. 6.

Accordingly, calls within a local area 101 may be enabled even if connectivity with central processing device 112 is lost. This is allowed because gateway 102 stores contact information during a registration process for telephones 106. Gateway 102 also determines how long the registrations are valid and only connects communications if central processing device 112 determines that the registration requests for telephones 106 are valid in one embodiment. Thus, the communications to telephones 106 in a local area 101 are sent only if they are authorized by central processing device 112 according to one embodiment of the present invention. Accordingly, increased security is provided when calls are not routed to central processing device 112.

Figure 6:
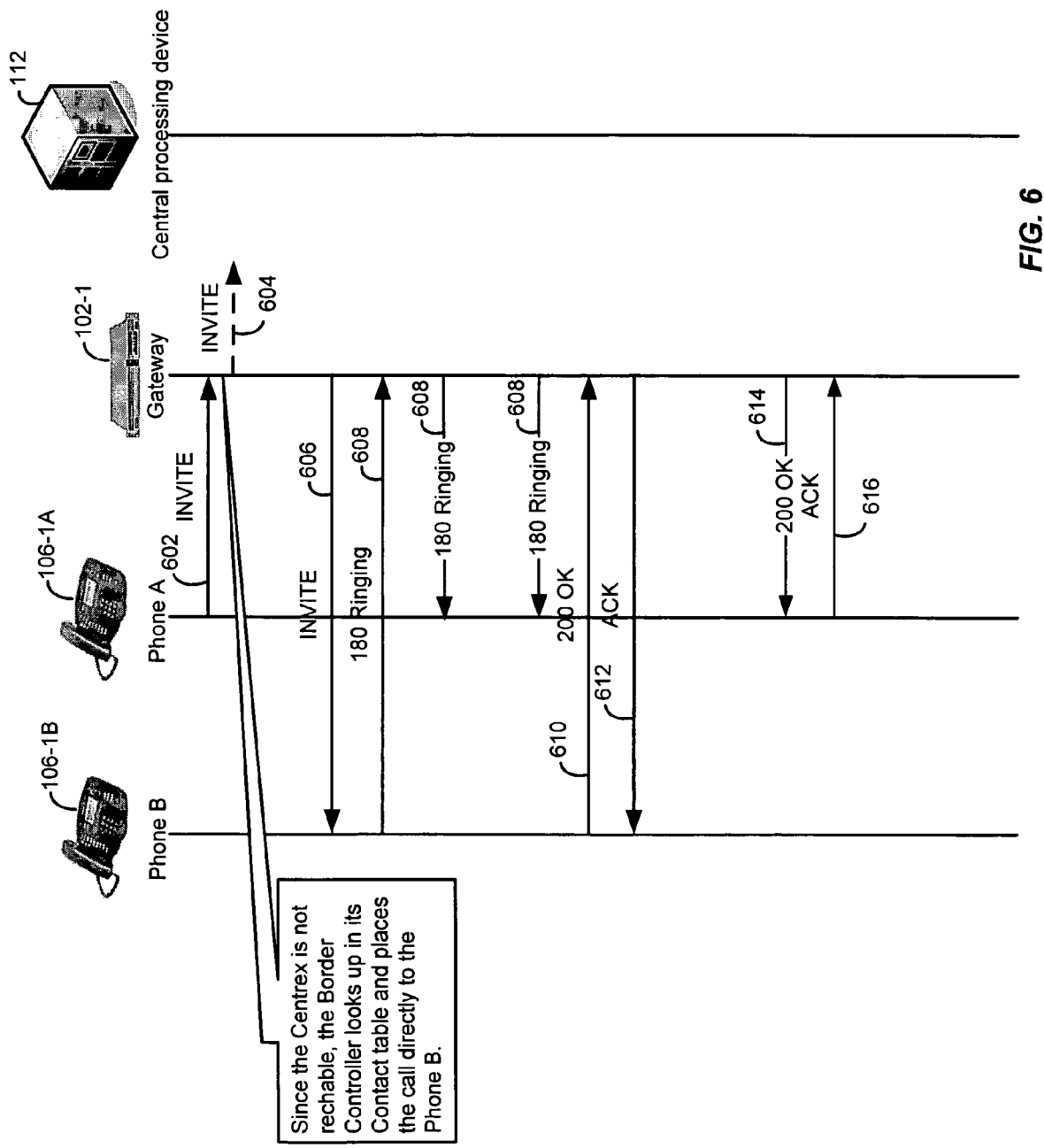
FIG. 6 depicts a message flow when connectivity is lost with the central processing device according to one embodiment of the present invention.

FIG. 6 depicts a message flow when connectivity is lost with central processing device 112 according to one embodiment of the present invention. As shown, at 602, telephone 106-1A sends an INVITE message to gateway 102-1. Gateway 102-1, at 604, determines that central processing device 112 is not reachable. Gateway 102 then looks up contact information for telephone 106-1B in storage device 204. Gateway 102-1 can then send the INVITE message to telephone 106-1B directly. This is because telephone 106-1B is in the same local area 101-1 as telephone 106-1A.

Gateway 102-1 may also authenticate telephone 106-1A and/or 106-1B. When the INVITE message at 608 is sent, the contact information is received from the INVITE message, gateway 102-1 may authenticate that telephone 106-1B as authorized to receive communications. For example, gateway 102-1 may check a local identity for telephone 106-1B, such as a username, IP address, password, etc. In one embodiment, if gateway 102-1 cannot verify usernames and passwords, gateway 102 may determine if the registration stored in storage device 204 has become invalid. For example, gateway 102-1 may extend the registration duration for telephones 106 such that they will expire during a bigger interval than usual. This is because gateway 102 does not have the authentication information. If the registration is still valid in storage device 204, then gateway 102-1 determines that telephone 106-1B is authorized to receive communications.

In one embodiment, in order to ensure security is maintained, telephones 106 may register before the connectivity is lost, and the registrations may be held for a certain duration. However, the telephones 106 may be required to periodically renew their registrations. Also, when connectivity to a central processing device 112 is lost, no new registrations may be accepted until the connectivity is restored.

Telephone 106-1B receives the INVITE message and sends a Ringing message, such as a 180 message, to gateway 102-1. Gateway 102-1 sends the 180 Ringing message to telephone 106-1A at 608.

When telephone 106-1B is picked up, a confirmation message, such as a 200 OK message, is sent at 610. Gateway 102-1 receives the message and sends an acknowledgement message, such as an ACK message at 612.

At 614, gateway 102-1 sends a confirmation message, such as 200 OK message, to telephone 106-1A. Telephone 106-1A then sends an acknowledgement, such as an ACK message at 616. The telephone 106-1A and telephone 106-1B may then be connected and a communication may take place, such as telephone conversation.

When connectivity detector 502 determines that connectivity has been restored, gateway 102-1 may resume sending communications through central processing device 112.

Accordingly, embodiments of the present invention provide many advantages. For example, when connectivity to central processing device 112 is lost, gateway 102 allows communications between telephones 106 in a local area 101 to continue. It is expected that LAN 104 may be more reliable than WAN 110, thus connectivity in LAN 104 may not be lost as easily. Thus, calls within local area 101 may continue, even if connectivity with central processing device 112 is lost. In one embodiment, telephones 106 may not be able to call external entities, such as calling from local area 101-1 to local area 101-2, but at least they may communicate with telephones 106 in the same local area.

The above is provided by storing contact information during communications between telephones 106 and central processing device(s) 112. This contact information may be stored after telephones have been registered and have been authorized. Thus, when communications are forwarded without contacting central processing device 112, security may be maintain as communications may only be forwarded to telephones 106 that have been authorized.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for providing routing of calls when connectivity with a central processing device is lost, the method comprising:
    receiving one or more registration requests from one or more entities at a gateway;
    sending the one or more registration requests to the central processing device;
    receiving from the central processing device an authorization message indicating that the one or more entities are registered with the central processing device;
    storing information for the one or more entities at the gateway in response to the authorization message, the information including identification information for the one or more entities and a duration for which registration of the one or more entities is valid;
    receiving at the gateway a communication from a first entity for a second entity in the one or more entities; and
    determining whether the first entity is authorized to initiate the communication based on the identification information and a validity of its registration;
    routing the communication to the second entity using the identification information stored for the second entity when it is determined that the first entity is authorized to initiate the communication and that connectivity with the central processing device is lost, wherein the communication bypasses the central processing device.

2. The method of claim 1, wherein the information includes credentials for the one or more users, wherein the gateway checks the credentials to authenticate the first entity.

3. The method of claim 2, wherein the credentials comprise a username and password.

4. The method of claim 2, wherein the communication includes a public identifier for the second entity, wherein the gateway uses the identification information to determine a local identifier for the second entity, wherein the communication is routed to the second entity using the local identifier.

5. The method of claim 1, wherein the first entity and the second entity are local to the gateway.

6. The method of claim 1, wherein the gateway extends the duration for which the registration of the one or more entities is valid such that the information is stored during the time.

7. The method of claim 1, wherein determining the connectivity with the central processing device is lost comprises pinging the central processing device.

8. The method of claim 1, further comprising:
    determining that the connectivity with the central processing device is restored; and
    routing communications from the one or more entities to the central processing device.

9. A gateway comprising a storage medium with control logic including a plurality of instructions configured to provide routing of calls when connectivity with a central processing device is lost, the gateway comprising: logic configured to receive one or more registration requests from one or more entities; logic configured to send the one or more registration requests to the central processing device; logic configured to receive from the central processing device an authorization message indicating that the one or more entities are registered with the central processing device; logic configured to store information for the one or more entities at the gateway in response to the authorization message, the information including identification information for the one or more entities and a duration for which registration of the one or more entities is valid; logic configured to determine that the connectivity with the central processing device is lost; logic configured to receive a communication from a first entity for a second entity in the one or more entities; logic configured to determine whether the first entity is authorized to initiate the communication based on the identification information and a validity of its registration; and logic configured to route the communication to the second entity using the identification information stored for the second entity when it is determined that the first entity is authorized to initiate the communication and that connectivity with the central processing device is lost, wherein the communication bypasses the central processing device.

10. The gateway of claim 9, wherein the information includes credentials for the one or more users, wherein the gateway checks the credentials to authenticate the first entity.

11. The gateway of claim 10, wherein the credentials comprise a username and password.

12. The gateway of claim 10, wherein the communication includes a public identifier for the second entity, wherein the gateway uses the identification information to determine a local identifier for the second entity, wherein the communication is routed to the second entity using the local identifier.

13. The gateway of claim 9, wherein the first entity and the second entity are local to the gateway.

14. The gateway of claim 9, wherein the gateway extends the duration for which the registration of the one or more entities is valid such that the information is stored during the time.

15. The gateway of claim 9, wherein logic configured to determine the connectivity with the central processing device is lost comprises logic configured to ping the central processing device.

16. The gateway of claim 9, further comprising:
    logic configured to determine that the connectivity with the central processing device is restored; and
    logic configured to route communications from the two or more entities to the central processing device.

17. A system configured to provide routing of calls when connectivity with a central processing device is lost, the system comprising: a plurality of communication devices; a central processing device configured to process a communication from a first communication device to a second communication device in the plurality of communication devices; and a gateway comprising a storage medium with a plurality of instructions, including: logic configured to receive registration requests from first and second communication devices; logic configured to send the registration requests to the central processing device; logic configured to receive from the central processing device an authorization message indicating that the one or more entities are registered with the central processing device; logic configured to store information for the first and second communication devices at the gateway in response to the authorization message, the information including identification information for the one or more entities and a duration for which registration of the one or more entities is valid; logic configured to determine that the connectivity with the central processing device is lost; logic configured to receive a communication from the first communication device for the second communication device; logic configured to determine whether the first entity is authorized to initiate the communication based on a validity of its registration; and logic configured to route the communication to the second entity using the identification information stored for the second entity when it is determined that the first entity is authorized to initiate the communication and that connectivity with the central processing device is lost, wherein the communication bypasses the central processing device.

18. The system of claim 17, wherein the central processing devices comprises a Centrex.

19. The system of claim 17, wherein the first and second communication devices comprise VoIP devices.

* * * * *